Aug. 2, 1938.   H. WOCHNER   2,125,534
RADIUS GAUGE FOR AUTOMOBILES
Original Filed Feb. 6, 1936   3 Sheets-Sheet 1

INVENTOR.
Henry Wochner
BY Walter N. Haskell,
his ATTORNEY.

Aug. 2, 1938.    H. WOCHNER    2,125,534
RADIUS GAUGE FOR AUTOMOBILES
Original Filed Feb. 6, 1936    3 Sheets-Sheet 2

INVENTOR.
Henry Wochner.
BY Walter N. Haskell.
his ATTORNEY.

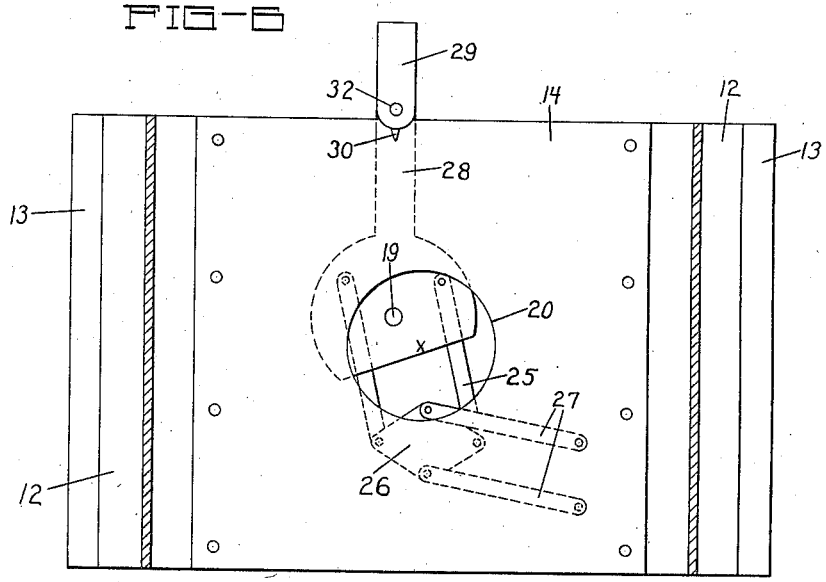
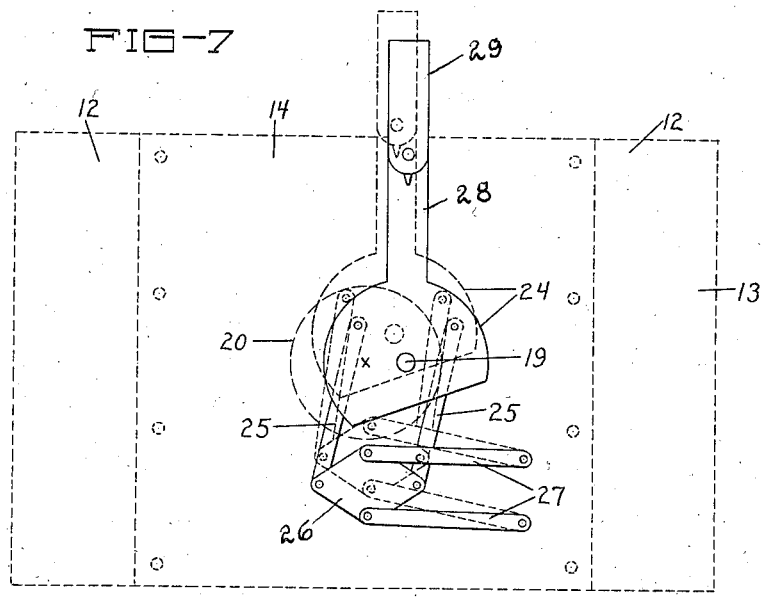

Patented Aug. 2, 1938

2,125,534

UNITED STATES PATENT OFFICE 2,125,534

RADIUS GAUGE FOR AUTOMOBILES

Henry Wochner, Rock Island, Ill., assignor to Bear Manufacturing Company, Rock Island, Ill., a corporation Application February 6, 1936, Serial No. 62,666
Renewed November 24, 1937

4 Claims. (Cl. 33—203)

My invention has reference to a radius gauge for automobiles, of that type for which application for Letters Patent of the United States was filed by myself July 9, 1934, Serial No. 734,357. The chief function thereof is to support one of the front wheels of an automobile so that it will respond readily to the turning impulse of the steering apparatus, and make it possible to detect inaccuracies in the turning radius, and indicate how the same may be corrected.

It has been the practice to provide instruments of the kind mentioned in duplicate form, for simultaneous use for both of the front wheels of a vehicle, with connections between the units to establish their relative positions, and the present invention can have such dual construction, if desired. In the present showing, however, it is limited to a single gauge, of a form which can be used on the floor of a garage, in the path of a wheel that is to be tested.

One of the objects of the invention is to provide a support for the tread of a wheel capable of a rotatable movement on its axis, so as to respond quickly to the impulse of the wheel supported thereon, in the turning operation.

Another purpose thereof is to provide a support for the wheel which is capable of movement in any direction in a horizontal plane, in addition to said rotary movement, so as to respond quickly to any eccentric tendencies of the wheel.

Another purpose of the invention is to provide an anchorage for the supporting disk for the wheel of a floating character, which will instantly follow any tendencies of the supporting member toward movement in a horizontal plane.

Another feature thereof consists in the provision of means for determining the degree of movement of the wheel in either direction, and the amount of inaccuracy thereof, if any. This consists of a compound system of braces, holding the wheel supporting parts from casual release, and at the same time yielding freely to any inclinations of movement of said parts in response to the action of a wheel.

The above-named, and other features and advantages of the invention will be more fully set forth in the following specification, reference being had to the accompanying drawings, in which;

Fig. 6 is a similar diagrammatical view, with the axial point to the left and above the center.

Fig. 7 is another view illustrating further the possibilities of movements of the plate 24 to the right of the center.

Figure 1:
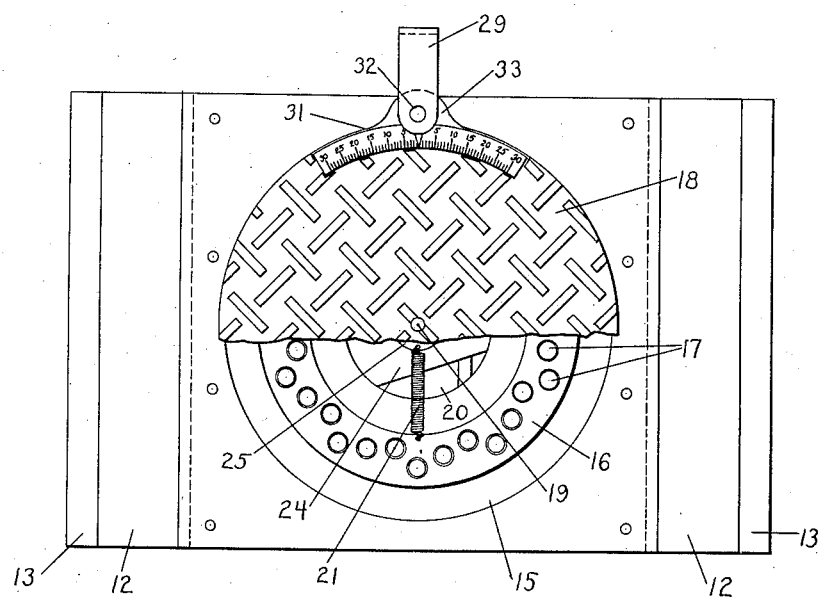
Fig. 1 is a plan view of the invention, with a part of the tread plate broken away.
Figure 2:
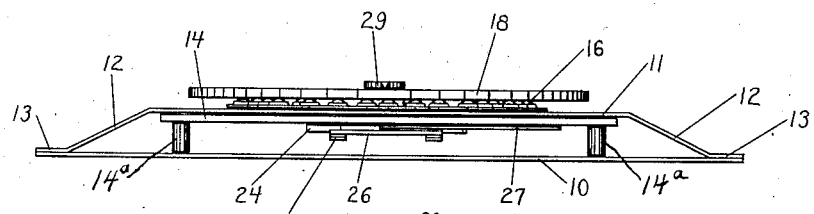
Fig. 2 is an edge view of the invention.
Figure 3:
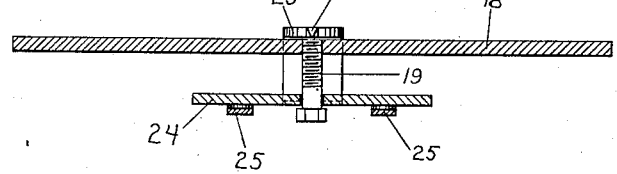
Fig. 3 is a detail, in section, of the tread-plate 18 and anchor-plate therefor.

The main support of the invention consists of a base-plate 10, above which is supported a plate 11, with end inclines 12 extending downwardly to a connection with the plate 10 at 13, which inclines provide runways for the wheels of an automobile passing onto or off from the device.

Supported on posts 14a beneath the plate 11 is a plate 14, all of said plates being of rectangular form, and preferably made of sheet metal. The plate 11 is provided with a central opening 15, and operable on the plate 14 within said opening is an anti-friction apparatus consisting of a circular plate 16, containing pockets for bearing balls 17. Supported on said balls is a circular tread-plate or disk 18, at a central point of which is fixed the upper end of a pivot pin 19, which has a limited amount of lateral play in an opening 20 in the plate 14. The plate 16 is held yieldably in place by radial springs 21, connecting the same with a collar 22 loosely encircling the pivot 19. This part of the mechanism is not considered to be new in the present application.

The lower end of the pin 19 passes through an opening in an anchor plate 24, and is provided with a head at its lower extremity, upon which the plate 24 rests. The diameter of said plate is greater than that of the opening 20, and prevents accidental release of the plate 18. The pin 19 also turns freely in the plate 24, whereby the plate 18 is capable of rotation independently of the plate 24. Pivoted to the plate is a pair of spaced arms 25, the other ends of which have a pivotal connection with the ends of a diamond-shaped plate 26, the arrangement being such that the arms are at all times in parallel relation with each other. Another pair of arms 27 is pivoted at the sides of the plate 26, the other ends of said arms having pivotal connections with the lower face of the plate 14, said latter arms also being in parallel relation with each other, and at right angles with the arms 25. The plate 24 is thereby supported so as to have a floating action, and respond quickly to the action of the pivot pin 19, impelled by the plate 18.

Figure 4:
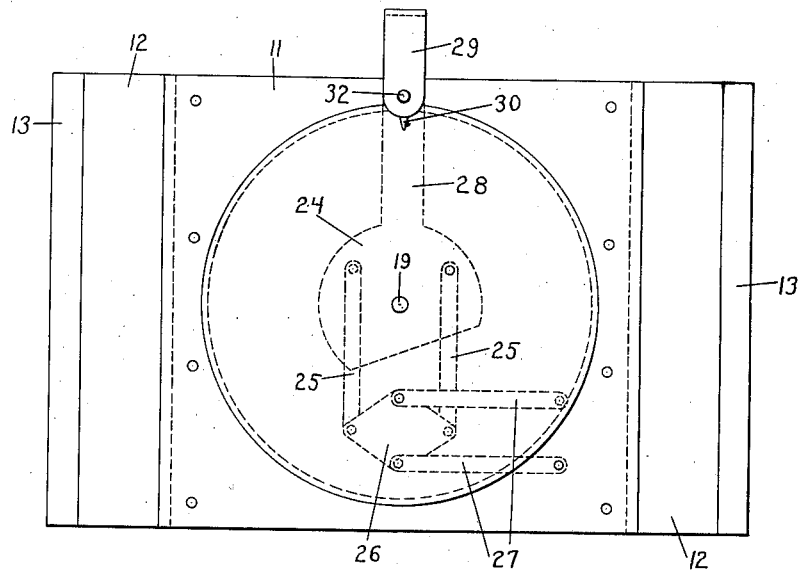
Fig. 4 is a view similar to Fig. 1, with the plate 18 and anti-friction apparatus removed.
Figure 5:
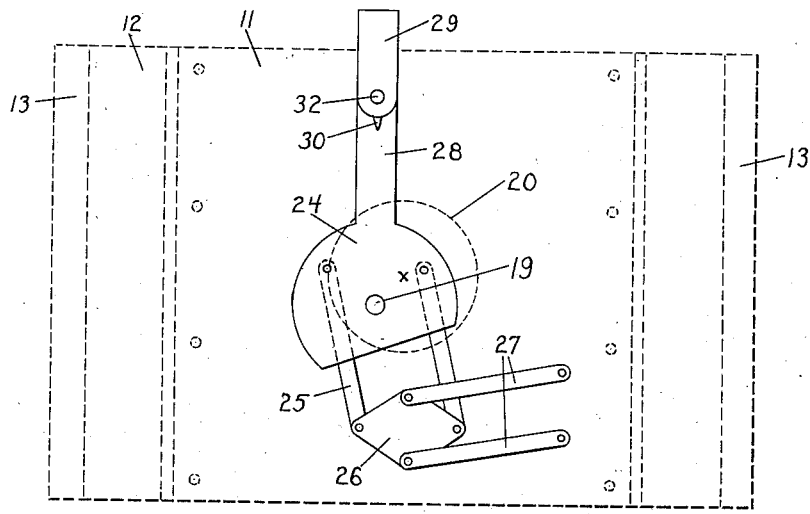
Fig. 5 is a similar view with the plates shown in broken lines and the disk controlling means in full lines, with the axial point shifted to the left and downwardly.

By means of the parallel arm mechanism above described, a universal movement in a horizontal plane is accorded the plate 24, various positions of said apparatus in following the movements of said plate being shown in Figs. 4 to 7, inclusive. In Fig. 4 the axis 19 is in a normally central position, with the arms 25 transversely of the frame plates, and the arms 27 length-wise thereof. In Fig. 5 the axis is below and at the left of the center, indicated at x, and in Figs. 6 and 7 other shifted positions of the plate 24 are shown, some of which tend to increase the angles of the arms 25 and 27, and others of which tend to make them more acute. One edge of the plate 24 is cut away to prevent contact thereof by the plate 26.

Integral with the plate 24, and projected radially from one edge thereof is an arm 28, provided at its outer end with a bend 29, extending over the edge of the disk 18, and provided at its end with a pointer 30, for use with a gauge 31 on the face of said disk. The scale markings extend in both directions from a central or zero point, to indicate the degree of turn of the disk and wheel to be supported thereon in one direction or the other. When the reading shows that there is a deviation in the angle from what is considered to be a normal amount, corrections can be made in the steering mechanism to overcome same.

The end of the loop 29 is provided with a perforation 32, registering normally with similar openings in an extension 33 on the edge of the plate 18 and in the plates 11 and 14 below the same, and not shown in the drawings. By the insertion of a pin in said openings the plate 18 and arm 28 can be held from movement, while a wheel is being supported on said plate. This is not a novel expedient.

It will be noted that by reason of the common connection of the plate 18 and arm 28 with the pin 19 the relative positions of the plate and arm will be unchanged in any movement of the plate in a horizontal plane, and a reading of the scale 31 can be had in any position the plate may assume.

In operation, a wheel is run upon the apparatus longitudinally thereof, with the disk 18 held from rotation. The disk is then freed, and the steering gear of the vehicle operated to turn the disk and wheel in one direction or the other. If there is a tendency of the wheel to move to one side or the other to give an impulse to the disk other than to rotate the same, this is instantly followed by the movement of the disk in a horizontal plane, in addition to the rotary movement thereof, any resistance to such movement being reduced to a minimum by the ball bearing devices and by the floating anchorage for said disk. Upon the wheel being returned to its original position the disk 18 is replaced in its central position by the force of the wheel, and with the assistance of the springs 21. As before stated, the degree of angular movement of the wheel is readable on the gauge 31. The instrument is preferably set with said gauge on the outer side of the vehicle, where the markings can be easily seen. In case two of the devices are used, they are set with both of the gauges outwardly. In case a reading of two wheels is taken on the same instrument, after one thereof has been operated and tested, the position of the instrument can be reversed, so as to have the gauge on the outside in each case.

What I claim, and desire to secure by Letters Patent, is:

1. A device of the class described, comprising a base, a wheel supporting disk mounted thereon for rotation, an anchor-plate for said disk in said base, and a compound leverage between said anchor-plate and base comprising two pairs of arms and connections between one of said pairs and the other pair, with a substantially right-angle disposition of one pair to the other, whereby said anchor-plate and disk are capable of a free movement in a horizontal plane.

2. A device of the class described, comprising a base, a wheel supporting disk mounted thereon to rotate, an anchor-plate in said base operatively connected with said disk, a ball-bearing mechanism between said base and disk, and a compound leverage connecting said anchor-plate with said base comprising a central connection and connections between said central connection and said anchor-plate in one direction, and with said base in another direction, whereby said anchor-plate and disk are capable of movement in any direction in a horizontal plane.

3. In a device of the class described, a base, a disk supported on said base provided with a central pivot for rotation, an anchor-plate for said pivot, a leverage system connecting said anchor-plate with the base comprising pairs of arms having pivotal central connections, and pivotally connected in opposite directions, respectively, with said anchor-plate and said base, whereby said anchor-plate is capable of moving freely in a horizontal plane, an indicator operatively connected with said anchor-plate, and a gauge on said disk for operation with said indicator, to show the degree of rotation of said disk.

4. In a device of the class described, a base formed of spaced plates, a wheel supporting disk mounted thereon, a ball-bearing mechanism between said disk and its support, an anchor-plate connected with said disk, a coupling plate having a swingable connection with one of the plates of said base, and swingable connections between said coupling plate and anchor-plate, whereby said anchor-plate is movable freely in a horizontal plane.

HENRY WOCHNER.